United States Patent
Basso et al.

(10) Patent No.: US 8,955,031 B2
(45) Date of Patent: *Feb. 10, 2015

(54) SYSTEM AND METHOD FOR GENERATING CODED VIDEO SEQUENCES FROM STILL MEDIA

(75) Inventors: Andrea Basso, Turin (IT); Eric Cosatto, Red Bank, NJ (US); Steven Lloyd Greenspan, Scotch Plains, NJ (US); David M. Weimer, Aberdeen, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 45 days.

This patent is subject to a terminal disclaimer.

(21) Appl. No.: 13/205,321

(22) Filed: Aug. 8, 2011

(65) Prior Publication Data

US 2012/0033743 A1   Feb. 9, 2012

Related U.S. Application Data

(63) Continuation of application No. 09/650,355, filed on Aug. 29, 2000, now Pat. No. 7,996,878.

(60) Provisional application No. 60/151,543, filed on Aug. 31, 1999.

(51) Int. Cl.
*H04N 7/10* (2006.01)
*H04N 7/16* (2011.01)
(Continued)

(52) U.S. Cl.
CPC ..... *H04N 21/23412* (2013.01); *H04N 21/8153* (2013.01)
USPC ................ 725/135; 725/23; 725/32; 725/34; 725/35; 725/46; 715/723

(58) Field of Classification Search
USPC ......................... 725/23, 46–47, 135; 715/723
See application file for complete search history.

(56) References Cited

U.S. PATENT DOCUMENTS

| 5,086,385 A | | 2/1992 | Launey et al. |
| 5,264,933 A | * | 11/1993 | Rosser et al. ................. 348/578 |
| 5,267,034 A | | 11/1993 | Miyatake et al. |

(Continued)

*Primary Examiner* — An Son P Huynh

(57) ABSTRACT

The invention provides a system and method that transforms a set of still/motion media (i.e., a series of related or unrelated still frames, web-pages rendered as images, or video clips) or other multimedia, into a video stream that is suitable for delivery over a display medium, such as TV, cable TV, computer displays, wireless display devices, etc. The video data stream may be presented and displayed in real time or stored and later presented through a set-top box, for example. Because these media are transformed into coded video streams (e.g. MPEG-2, MPEG-4, etc.), a user can watch them on a display screen without the need to connect to the Internet through a service provider. The user may request and interact with the desired media through a simple telephone interface, for example. Moreover, several wireless and cable-based services can be developed on the top of this system. In one possible embodiment, the system for generating a coded video sequence may include an input unit that receives the multimedia input and extracts image data, and derives the virtual camera scripts and coding hints from the image data, a video sequence generator that generates a video sequence based on the extracted image data and the derived virtual camera scripts and coding hints, and a video encoder that encodes the generated video sequence using the coding hints and outputs the coded video sequence to an output device. The system may also provide customized video sequence generation services to subscribers.

18 Claims, 3 Drawing Sheets

(51) Int. Cl.
*H04N 21/234* (2011.01)
*H04N 21/81* (2011.01)

(56) References Cited

U.S. PATENT DOCUMENTS

| | | | |
|---|---|---|---|
| 5,404,316 A | 4/1995 | Klingler et al. | |
| 5,491,517 A * | 2/1996 | Kreitman et al. | 348/581 |
| 5,517,605 A | 5/1996 | Wolf | |
| 5,598,208 A | 1/1997 | McClintock | |
| 5,644,694 A * | 7/1997 | Appleton | 345/474 |
| 5,664,227 A * | 9/1997 | Mauldin et al. | 715/203 |
| 5,703,995 A | 12/1997 | Willbanks | |
| 5,714,997 A | 2/1998 | Anderson | |
| 5,715,019 A * | 2/1998 | Yata | 348/722 |
| 5,736,977 A | 4/1998 | Hughes | |
| 5,757,418 A | 5/1998 | Inagaki | |
| 5,805,733 A | 9/1998 | Wang et al. | |
| 5,808,695 A * | 9/1998 | Rosser et al. | 348/584 |
| 5,812,736 A | 9/1998 | Anderson | |
| 5,818,439 A | 10/1998 | Nagasaka et al. | |
| 5,823,786 A * | 10/1998 | Easterbrook | 434/247 |
| 5,831,664 A | 11/1998 | Wharton et al. | |
| 5,835,667 A * | 11/1998 | Wactlar et al. | 386/241 |
| 5,850,352 A | 12/1998 | Moezzi et al. | |
| 5,872,575 A * | 2/1999 | Segal | 345/473 |
| 5,892,535 A | 4/1999 | Allen et al. | |
| 5,900,953 A | 5/1999 | Bottou et al. | |
| 5,923,365 A * | 7/1999 | Tamir et al. | 348/169 |
| 5,938,766 A * | 8/1999 | Anderson et al. | 713/100 |
| 5,956,026 A | 9/1999 | Ratakonda | |
| 5,963,203 A | 10/1999 | Goldberg et al. | |
| 5,986,668 A | 11/1999 | Szeliski et al. | |
| 5,987,179 A * | 11/1999 | Riek et al. | 382/236 |
| 6,006,241 A | 12/1999 | Purnaveja et al. | |
| 6,006,257 A * | 12/1999 | Slezak | 725/110 |
| 6,006,265 A * | 12/1999 | Rangan et al. | 709/226 |
| 6,029,045 A | 2/2000 | Picco et al. | |
| 6,032,156 A * | 2/2000 | Marcus | 1/1 |
| 6,052,492 A | 4/2000 | Bruckhaus | |
| 6,115,035 A * | 9/2000 | Compton et al. | 715/717 |
| 6,138,147 A | 10/2000 | Weaver et al. | |
| 6,139,197 A | 10/2000 | Banks | |
| 6,144,375 A | 11/2000 | Jain et al. | |
| 6,154,771 A * | 11/2000 | Rangan et al. | 709/217 |
| 6,177,931 B1 | 1/2001 | Alexander et al. | |
| 6,185,363 B1 * | 2/2001 | Dimitrova et al. | 386/243 |
| 6,188,398 B1 * | 2/2001 | Collins-Rector et al. | 725/37 |
| 6,195,497 B1 | 2/2001 | Nagasaka et al. | |
| 6,211,869 B1 | 4/2001 | Loveman et al. | |
| 6,216,129 B1 | 4/2001 | Eldering | |
| 6,223,190 B1 | 4/2001 | Aihara et al. | |
| 6,230,162 B1 * | 5/2001 | Kumar et al. | 382/240 |
| 6,236,395 B1 | 5/2001 | Sezan et al. | |
| 6,240,555 B1 * | 5/2001 | Shoff et al. | 725/110 |
| 6,266,068 B1 | 7/2001 | Kang et al. | |
| 6,282,713 B1 | 8/2001 | Kitsukawa et al. | |
| 6,307,550 B1 | 10/2001 | Chen et al. | |
| 6,330,004 B1 | 12/2001 | Matsuzawa et al. | |
| 6,360,234 B2 | 3/2002 | Jain et al. | |
| 6,369,835 B1 | 4/2002 | Lin | |
| 6,377,294 B2 | 4/2002 | Toyofuku et al. | |
| 6,380,950 B1 | 4/2002 | Montgomery et al. | |
| 6,405,175 B1 | 6/2002 | Ng | |
| 6,442,538 B1 | 8/2002 | Nojima | |
| 6,446,261 B1 | 9/2002 | Rosser | |
| 6,449,608 B1 | 9/2002 | Morita et al. | |
| 6,463,585 B1 | 10/2002 | Hendricks et al. | |
| 6,466,275 B1 | 10/2002 | Honey et al. | |
| 6,470,378 B1 | 10/2002 | Tracton et al. | |
| 6,496,981 B1 | 12/2002 | Wistendahl et al. | |
| 6,505,169 B1 | 1/2003 | Bhagavath et al. | |
| 6,507,872 B1 | 1/2003 | Geshwind | |
| 6,516,090 B1 | 2/2003 | Lennon et al. | |
| 6,553,178 B2 | 4/2003 | Abecassis | |
| 6,567,980 B1 | 5/2003 | Jain et al. | |
| 6,571,054 B1 | 5/2003 | Tonomura et al. | |
| 6,573,907 B1 | 6/2003 | Madrane | |
| 6,578,011 B1 | 6/2003 | Forward | |
| 6,584,463 B2 | 6/2003 | Morita et al. | |
| 6,597,861 B1 | 7/2003 | Tozaki et al. | |
| 6,602,297 B1 | 8/2003 | Song | |
| 6,608,930 B1 | 8/2003 | Agnihotri et al. | |
| 6,609,658 B1 | 8/2003 | Sehr | |
| 6,628,303 B1 | 9/2003 | Foreman et al. | |
| 6,631,522 B1 | 10/2003 | Erdelyi | |
| 6,665,003 B1 | 12/2003 | Peleg et al. | |
| 6,677,981 B1 | 1/2004 | Mancuso et al. | |
| 6,698,020 B1 * | 2/2004 | Zigmond et al. | 725/34 |
| 6,710,785 B1 | 3/2004 | Asai et al. | |
| 6,711,741 B2 | 3/2004 | Yeo | |
| 6,718,551 B1 | 4/2004 | Swix et al. | |
| 6,738,075 B1 | 5/2004 | Torres et al. | |
| 6,750,919 B1 * | 6/2004 | Rosser | 348/584 |
| 6,766,524 B1 | 7/2004 | Matheny et al. | |
| 6,769,127 B1 | 7/2004 | Bonomi et al. | |
| 6,774,926 B1 | 8/2004 | Ellis et al. | |
| 6,782,550 B1 | 8/2004 | Cao | |
| 6,789,228 B1 | 9/2004 | Merril et al. | |
| 6,799,326 B2 | 9/2004 | Boylan et al. | |
| 6,810,526 B1 * | 10/2004 | Menard et al. | 725/46 |
| 6,820,277 B1 | 11/2004 | Eldering et al. | |
| 6,833,865 B1 * | 12/2004 | Fuller et al. | 348/231.2 |
| 6,877,134 B1 | 4/2005 | Fuller et al. | |
| 6,882,793 B1 | 4/2005 | Fu et al. | |
| 6,937,273 B1 * | 8/2005 | Loui | 348/220.1 |
| 6,961,957 B2 * | 11/2005 | Carlson | 2/2.5 |
| 7,043,048 B1 | 5/2006 | Ellingson | |
| 7,079,176 B1 | 7/2006 | Freeman et al. | |
| 7,114,174 B1 | 9/2006 | Brooks et al. | |
| 7,185,355 B1 * | 2/2007 | Ellis et al. | 725/46 |
| 7,313,808 B1 | 12/2007 | Gupta et al. | |
| 7,996,791 B2 * | 8/2011 | Rashkovskiy | 715/838 |
| 7,996,878 B1 * | 8/2011 | Basso et al. | 725/135 |
| 2001/0005218 A1 * | 6/2001 | Gloudemans et al. | 348/157 |
| 2001/0018693 A1 * | 8/2001 | Jain et al. | 707/500 |
| 2001/0023436 A1 * | 9/2001 | Srinivasan et al. | 709/219 |
| 2001/0028399 A1 | 10/2001 | Conley | |
| 2001/0049701 A1 | 12/2001 | Howerton et al. | |
| 2002/0103697 A1 | 8/2002 | Lockhart et al. | |
| 2002/0116256 A1 | 8/2002 | DeRafael et al. | |
| 2005/0028194 A1 * | 2/2005 | Elenbaas et al. | 725/32 |
| 2005/0028208 A1 * | 2/2005 | Ellis et al. | 725/58 |
| 2005/0149964 A1 | 7/2005 | Thomas et al. | |
| 2005/0262542 A1 | 11/2005 | DeWeese et al. | |
| 2006/0064641 A1 | 3/2006 | Montgomery et al. | |

\* cited by examiner

100

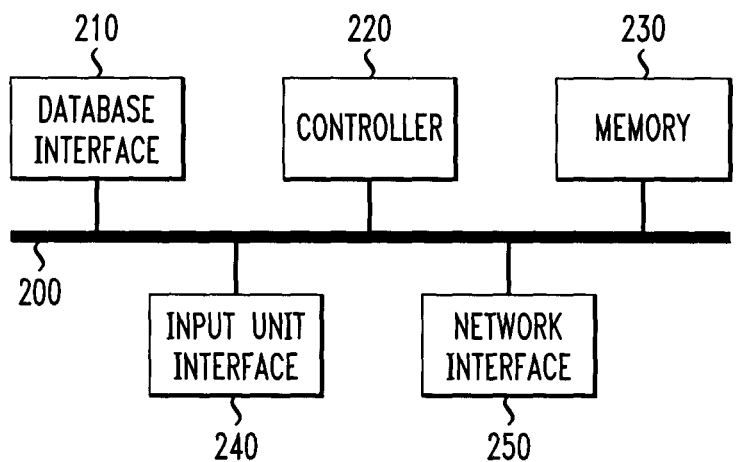
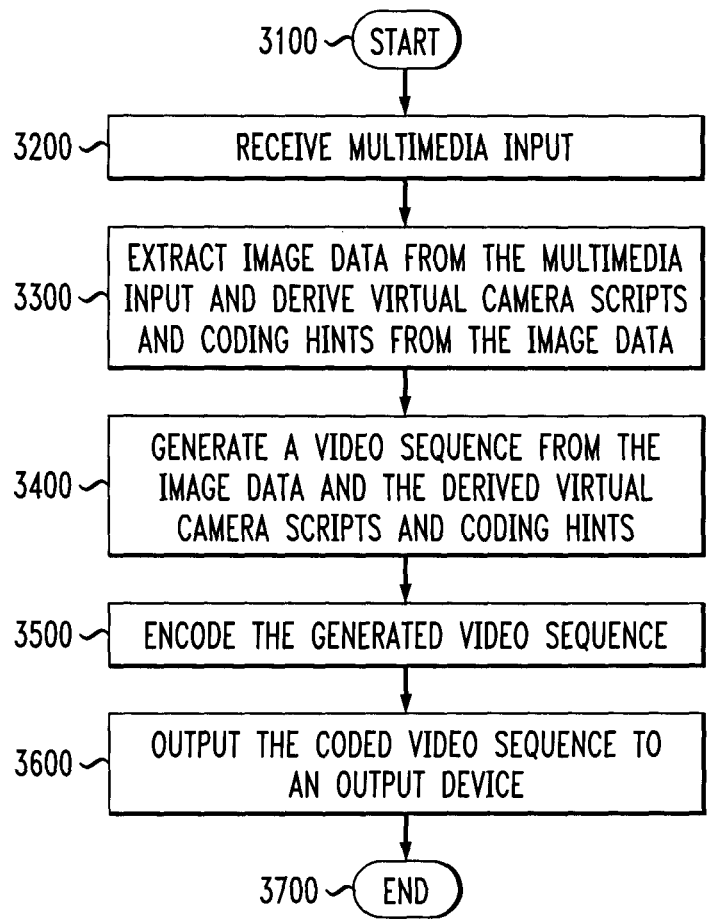

*FIG. 4*

| MATTHEW AND MEGAN SUBSCRIBER | | | ID# 123-456-7890 | |
|---|---|---|---|---|
| FORMAT SETTINGS 410 | CODING PREFERENCES 420 | SPECIAL HANDICAP SETTINGS 430 | ADDRESSES/URLS OF PICTURES 440 | " |
| | | | | |

SYSTEM AND METHOD FOR GENERATING CODED VIDEO SEQUENCES FROM STILL MEDIA

The present application is a continuation of U.S. patent application Ser. No. 09/650,355, filed Aug. 29, 2000, which claims the benefit of U.S. Provisional Patent Application No. 60/151,543, filed Aug. 31, 1999, and incorporated herein by reference in their entirety.

TECHNICAL FIELD

The invention relates to generating coded video sequences suitable for presentation and display, from any media (still or motion pictures) in compressed or uncompressed format, such as series of related or unrelated still frames, web pages, 3D synthetic objects, or short video clips, or any combination thereof.

BACKGROUND OF THE INVENTION

The advent of digital television (TV) and the large deployment of cable and wireless communications have increased the need to process and display multimedia data in variety of formats. For example, TV, computer displays and portable communication devices are ideal devices for the multimedia delivery and presentation of visual information, such as still pictures, panorama images, high resolution medical images, street maps, aerial pictures, etc., to a large number of customers. In particular, TV is a low-resolution device that is suitable for presentation of both analog and digital encoded video and audio.

SUMMARY OF THE INVENTION

The invention provides a system and method that transforms a set of still/motion media (i.e., a series of related or unrelated still frames, web-pages rendered as images, or video clips) or other multimedia, into a video stream that is suitable for delivery over a display medium, such as TV, cable TV, computer displays, wireless display devices, etc. The video data stream may be presented and displayed in real time or stored and later presented through a set-top box, for example. Because these media are transformed into coded video streams (e.g. MPEG-2, MPEG-4, etc.), a user can watch them on a display screen without the need to connect to the Internet through a service provider. The user may request and interact with the desired media through a simple telephone interface, for example. Moreover, several wireless and cable-based services can be developed on the top of this system.

In one possible embodiment, the system for generating a coded video sequence may include an input device that receives the multimedia input and extracts image data, and derives the virtual camera scripts and coding hints from the image data, a video sequence generator that generates a video sequence based on the extracted image data and the derived virtual camera scripts and coding hints, and a video encoder that encodes the generated video sequence using the coding hints and outputs the coded video sequence to an output device. The system may also provide customized video sequence generation services to subscribers.

BRIEF DESCRIPTION OF THE DRAWINGS

The invention is described in detail with reference to the following drawings wherein like numerals reference like elements, and wherein:

FIG. 2 is a block diagram of an exemplary video sequence generator;

FIG. 3 is a flowchart of an exemplary coded video sequence generating process; and FIG. 4 illustrates an exemplary subscriber profile.

DETAILED DESCRIPTION OF THE PREFERRED EMBODIMENTS

Figure 1:
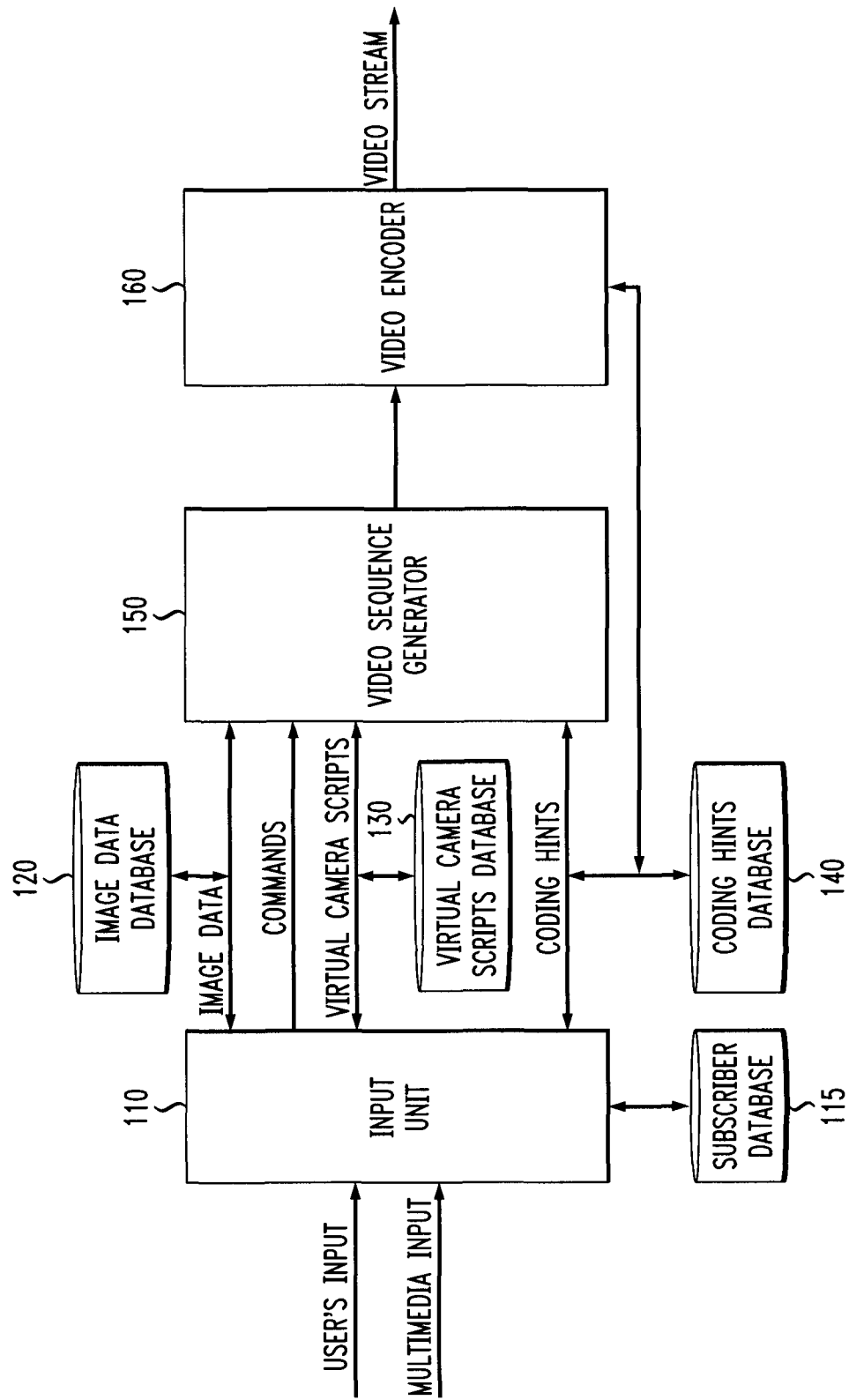
FIG. 1 is a block diagram of an exemplary coded video sequence generating system.

FIG. 1 is an exemplary block diagram of one possible embodiment of a coded video sequence generating system 100. The coded video sequence generating system 100 includes a video sequence generator unit 150 connected to an input unit 110, a subscriber database 115, an image data database 120, a virtual camera scripts database 130, a coding hints database 140, and a video encoder 160.

In one possible embodiment, the input unit 110 receives input multimedia 30 from one or more of a variety of sources including television, cable TV, interactive TV, the Internet or other computer networks, telephone, computer generated images, wireless communications, photographs, electronically stored still images, etc. The input unit 110 may also retrieve images, video clips, etc., or links to stored media, from a user/subscriber profile stored in the subscriber database 115. The input unit 110 then extracts information from the multimedia input, including image data, and in one possible embodiment, derives virtual camera scripts, and coding hints (described in detail below) from the image data. The input unit 110 may extract the image data according to any method known to one skilled in the art, including the AT&T DjVU still coding scheme and the methods described in U.S. Pat. No. 5,900,953, which is incorporated by reference in its entirety.

The virtual camera scripts and the coding hints (examples of which are listed in detail below) may be manually input or derived by a system operator based on the operators knowledge of the image, (i.e., the image contains text, the desired scrolling pattern, etc.), or input based on the operators desired output effect (i.e., different compression techniques for background and foreground, scrolling horizontally or vertically, etc.). Alternatively, the virtual camera scripts and the coding hints may be automatically extracted or derived from the extracted image data or directly from the input multimedia input. To perform this automatic extraction or derivation, any known method or algorithm known to one skilled in the art that can derive the virtual camera scripts and coding hints listed below, may be used within the spirit and scope of the invention.

The input unit 110 may directly input the image data, virtual camera scripts and coding hints to the video sequence generator 150. Alternatively, the input unit 110 may store the image data in the image data database 120, the virtual camera scripts in the virtual camera scripts database 130, and the coding hints in the coding hints database 140. The input unit 110 may also send commands directly to the video sequence generator 150, such as directions concerning the starting and stopping of transactions.

A description and examples of the types and content of image data, virtual camera scripts, and coding hints extracted by the input unit 110, are described below. The image data may include, but should not be limited to, the following:

Large images or pixelmaps, such as high-resolution street maps or aerial images, which are coded in TIFF, GIF, JPEG, etc., format.

A series of related or unrelated still frames or pixelmaps, such as the image components of a panorama image (related), or a series of photographs from a film (unrelated), coded in pixelmap formats TIFF, GIF, JPEG, etc.

Web pages rendered as images in the form of a single image or multiple images.

Single panorama files containing a panoramic view in a specific format appropriate for panorama navigation. File formats may include QuickTime VR, IPIX, etc.

Single files containing vector representation of text and graphics, such as HTML, Postscript, ASCII text, etc.

Short video clips.

Single files containing a vector representation of (synthetically coded) 3D worlds, such as VRML.

Lightfields of single objects. A lightfield is a collection of images of a single object under different viewpoints.

One or more of the above listed image data.

The virtual camera scripts (VCScript) algorithmically describe the operations that the video sequence generator 150 has to execute to transform the input data into the desired image sequence. Note that virtual camera scripts can be nested in the sense that a virtual camera script can include other virtual camera scripts in its body. The virtual camera scripts may include, but are not limited to, the following list of possible transformations.

A sliding window of resolution, comparable to the TV resolution, spans the input data in order to generate a sequence of frames that simulates a camera movement such as panning/tilting/zooming.

Simulating document browsing by page such that consecutive pages do not overlap and access is either sequential or random.

General composition of images or video clips. A set of images or video clips may be juxtaposed with or without transparency.

Special imaging techniques that can be used to synthesize (or simulate) videos from a set of images. One such technique is known as panorama synthesis where several pictures are taken from a single point of view but cover 360° around the camera and are then stitched together to from a panorama picture. Then, using special projection techniques, camera rotation around its axis can be simulated.

Other more elaborate techniques can account for parallax, when camera motion is parallel to the subject being viewed. These techniques provide a better sense of perspective and make the experience more realistic. The techniques include transparency mattes and light fields.

More general camera motions and object manipulation can be used when viewing objects or worlds represented in 3D.

As an example of a virtual camera script, a simple sequence of 100 frames of TV resolution (640×480 pixels) showing a panning on the original input image corresponds to the following:

```
Win = window 640 480;
For i = 1 to 100
{
Frame[i] = SHIFT 10*i pixels vertically Win
}.
```

According to this example, the virtual camera script dictates that 100 frames are to be vertically scrolled at a constant vertical velocity. Note that only the vertical motion vector is specified.

Coding hints are provided to the video encoder 160 in order to optimize coding performance. Coding hints reveal the encoding process for each frame as well as define the temporal evolution of each frame. As stated above, the coding hints may be provided by the operator or derived from the image data. The coding hints may be provided by the video encoder 160 or output device based on desired or required coding for the video data stream. In other words, the output device and/or output media may require a particular coding treatment.

The coding hints may also be generated by the video sequence generator 150. Thus, any way the system can determine coding hints that, for example, will specify the frame number in the sequence and the number of frames to which such parameters should be applied in the encoding process, may be used. The relevant information for the previously described transformations are provided in but are not limited to, the list below:

In the case of panning/tilting/zooming, the motion information used to generate the sequences of frames can be passed to the video encoder 160, (which may be typically a Hybrid inter/intra frame encoder) and need not to be computed by the video encoder 160 itself. This process will save cycles in the encoding process as well as improve the coding performances because the motion does need to be estimated since the exact motion values are available.

For composition, coding parameters can be specific to each, as opposed the final, composite image.

In the case of frame repetition, such information will be inserted in the formatted output sequence of frames in a format understandable by the decoder/set-top box.

The above listed image data, virtual camera scripts, and coding hints are purely exemplary in nature and the invention may encompass many other types of data and formats currently existing or developed in the future.

The image data, virtual camera scripts and coding hints for a particular set of multimedia data are, of course, interrelated. For example, a set of stored image data may be associated with the set of virtual camera scripts that need to be applied to it as well as the associated coding hints to optimize the coding performance of the resulting sequence of frames.

The relationship between image data, virtual camera scripts and coding 30 hints can be illustrated by the example below. Let's say that the input media to the system is generally still pictures that may include some video clips. The virtual camera scripts are generated by a human (i.e., having a given picture that scrolls) or by a software used by a human. The input data is a picture 640×480 with some text on it. The operator desires to generate a simple camera script that will generate a scrolling and zooming of the picture itself. Therefore, the system needs to determine how much the image needs to scroll for every frame of the output sequence. This depends on the scrolling speed and other factors (i.e. frame rate etc). An operator can compute all these parameters and input them as a virtual camera script (note that alternatively, a software tool can perform these tasks).

The coding hints in this case are
1. The notion that the picture contains text (thus, the coding parameters should be optimized for text coding).
2. The exact motion that every pixel is known priori. So there is no need to compute it. The coding performance will be optimized because we know the exact pixel motion.

If it was not known that the image had some text, an algorithm that recognizes the presence and location of text in the image, would be desired so that the encoder can do optimize its performance. As discussed above, there are several algorithms that can be used which are beyond the scope of this patent and as such, will not be described here.

The operation of the video sequence generator 150 will now be described. The video sequence generator 150 receives input image data from the image data database 120, virtual camera scripts from the virtual camera scripts database 130, coding hints from the coding hints database 140, and commands from the input unit 110. The video sequence generator 150 rearranges, composes and processes the input image data in order to form a pixel map or a sequence of pixel maps of resolution equal to the TV resolution. These pixel maps can be in coded or non-coded form. This succession of pixel maps represents a video sequence that is then passed to the video encoder 160. The generation of the sequence of video frames starting from the input data image is specified by the virtual camera script as described below.

The image data database 120 contains image data in various formats, as described above. The video sequence generator 150 has to know each of these formats in order to render an image into a pixel map. For each image data format, there has to be a "rendering plug-in" available to decode the appropriate portion of the image data into a pixel-map. Each of these plug-in must offer a basic interface that takes as input specific parameters that enables the rendering plug-in to create a view of the image data. These parameters can be, but are not limited to, camera placement, object placement, document page number, etc.

The role of the video sequence generator 150 is to translate generic commands from the virtual camera script into a list of specific parameters and actions and render the frames accordingly. The virtual camera script can be fed directly to the video sequence generator 150 or can be part of a set of predefined scripts that reside in the virtual camera scripts database 130 or a composition of the two. The proper virtual camera scripts can be chosen on the basis of operator defined profiles and can be related to the nature of the input data.

As an example, the input unit 110 receives a command, such as "PAN over image X". The video sequence generator 150 loads the rendering engine associated to the type of image X. It then loads and executes the VCScript "PAN" which algorithmically describes how to generate a suite of images that simulate a lateral movement of a camera. For each step of the script, the video sequence generator 150 calls the rendering engine with appropriate parameters of the current panning position and obtains in return, the pixel map which is sent over to the video encoder 160. Additionally, the video sequence generator 150 may also generate coding hints for the video encoder 160 to optimize coding performance.

The video encoder 160 may include any encoding device or algorithm known to those skilled in the art. For example, the video encoder 160 may operate on the basis of requests of type:

<String ReqID><String Control><Raw Image>

In this request, a given image in raw format (<Raw Image>) is given as input together with high-level description contained in the <String Control> of the action or series of actions that should be performed by the encoding service on the raw image, to generate a sequence of coded frames suitable for display.

The video encoder 160 output will be in the form:

<String ReqID><MPEG2 sequence>

In this output, the <String ReqID> uniquely identifies the request and the resulting sequence of frames that will be coded in MPEG-2, for example.

The video sequence generator 150 then passes on the processed sequence of images to the video encoder 160 for encoding. The video encoder 160 (e.g., an MPEG encoder) can support a variety of features that are beyond the realm of simple encoding. For example, the video encoder 160 can implement a caching scheme, multicasting, composition of image elements, and composition of streams (e.g., pictures with audio), as well as, facilitate panning for thin TV clients. These features, as described below, can make a significant impact in providing effective user experiences for television-based interpersonal communication services (such as those described in U.S. patent application Ser. No. 09/223,161, filed Dec. 30, 1998, and entitled "Method And Apparatus For Internet Co-Browsing Over Cable Television And Controlled Through Computer Telephony", which is incorporated herein by reference in its entirety), as well as other services, for example.

Caching screens/images that are delivered by various proxies can help improve system performance. The caching process can also be combined with composition mechanisms so that pre-rendered images can be combined with other content. The caching process may rely on the URL to identify images. The request for a URL would be issued first to the video encoder 160 and if in cache, shipped to the destination. Any request that could not be satisfied with elements in the cache would result in a reply that would cause a request to be sent to the proxy responsible for locating and rendering the contents.

Addressing may be a part of the signaling. Any addressing scheme should include the capabilities of multicasting. Multicasting can be implemented as a request where each address can consist of a sequence of destinations, or a special request can be establishes a multicast group with a group address. The group address would cause all subsequent requests to be multicast to every address within the group.

Composition allows content to be delivered from multiple sources, and combined into a single image/stream before delivery to the TV. This feature can provide the following advantages:

Third parties can rent space on a service, and some portion of the screen could be allocated to them.

Audio could be combined with picture to form a combined audio-visual stream.

Web content could be combined with TV or other image sources.

Interactive events could be depicted on images within the server (e.g., telepointers, highlighting, etc.).

Composition would require a set of signaling conventions that allow images to be treated as parts of a final image. It would also need to include some layout information (e.g., coordinates/dimensions).

Spatial and temporal synchronization will be a critical part of the user's experience. In a 2-way or N-way conversation, the sender of the information should see what the recipients see (spatial synchronization). If there are multiple screens or some manner of scrolling a larger screen remotely, the views should remain consistent throughout the session. If someone is receiving the "pushed" screens in a PC, through a browser, there is less of a likelihood that the displays will remain synchronized.

If supports for multiple output formats are introduced, coded video streams (e.g., MPEG) could be sent to TVs and coded images (e.g., JPEG) could be sent to browser windows. Scrolling, or paging would be provided through a separate interface that would properly signal any changes through a server. Thus, while the PC user points their browser directly to the URL, the use of the same proxy by the TV viewer will insure spatial synchronization and consistent rendering of the screen.

Since this "push" may be the normal mode of operation, the sender will most often wish to view what they wish to send, before they send it. Then, the only issue involved in temporal synchronization is a back channel to signal to the sender that the encoded image has been sent. One other possible example of temporal synchronization is in the use of streams. Web contents could be parsed in a manner that there was a screen rendered, and corresponding text that could be converted to audio using text-to-speech. The video encoder 160 could sequence through the images at a rate that is synchronized with the audio stream. In essence, a web page or web site could be presented as a narrative.

Moreover, since the TV is low-resolution, users may want to have larger pages/images that can be scrolled. Currently most interactive TV applications use paging, not scrolling. The Web, however, is often authored with the expectation of being able to scroll. If the web proxy could deliver TV, and higher resolutions as needed, the video encoder 160 could cache the larger image. Scrolling can simply replace the existing view with one from the new location, or it can be depicted as a smooth scroll series of images.

The above listed encoding processes and encoders are purely exemplary in nature and the invention may encompass many other types of data and formats currently existing or developed in the future. After the encoding process is complete, the video encoder 160 outputs the coded video sequence as a video stream to an output device for viewing by the user.

Furthermore, while for ease of discussion the system and method described herein often refers to TV applications, the invention may be applied to cable TV, interactive TV, the Internet, telephones, portable communication devices, wireless communication devices, computer-generated image devices, etc. without departing from the spirit and scope of the invention.

The video sequence generation process will now be described with reference to FIGS. 2 and 3. FIG. 2 is a block diagram of an exemplary video sequence generator 150. The video sequence generator 150 may include a controller 220, a database interface 210, an input unit interface 240, a network interface, 250 and a memory 230 connected through bus 200.

According to the exemplary video sequence generation process shown in FIG. 3, the process begins at step 3100 and proceeds to step 3200 where a multimedia input is received by the input unit 110. At step 3300, the input unit 110 extracts image data, and derives the virtual camera scripts, and coding hints from the image data. In an alternative embodiment, at least one of the virtual camera scripts and coding hints may be derived from the input of a system operator.

The extracted image data and derived virtual camera scripts and coding hints are provided as inputs to the controller 220 of the video sequence generator 150 through the input unit interface 240. The image data (input and/or retrieved from the subscriber database 115), virtual camera scripts, and coding hints may also be input to the video sequence generator 150 from the respective image data, virtual camera scripts, and coding hints databases 120, 130, 140 through the database interface 210. Alternatively, one or more of the image data, virtual camera scripts, and coding hints may be input directly to the video sequence generator 150, or through a communications network (TV, telephone, Internet, etc.) via the network interface 250, and stored in the memory 230. The controller 220 may receive commands from the input unit 110 through the input unit interface 240 and may issue control commands to other components of the system such as the video encoder 160, or to external devices in a network though the network interface 250.

In step 3400, the controller 220 generates the video sequence from the input multimedia using the image data, virtual camera scripts and the coding hints and outputs the generated video sequence to the video encoder 160. In step 3500, the video encoder 160 encodes the generated video sequence based on the derived or generated coding hints and outputs the coded video sequence in step 3600. The process proceeds to step 3700 and ends.

There are many possible scenarios for utilizing the coded video sequence generating system 100. In one possible scenario, a customer contacts a real-estate agent by telephone requesting to visit a house without leaving his or her home. The agent, having an account with a cable provider to host media content, connects the customer to the system through the telephone. Using the telephone keypad, the customer is able to navigate interactively through the different rooms of the house.

In this scenario, a set of photographs has been taken from each room of this house and the resulting media resides at the cable provider's plant. Given the customer's input, the system uses a special plug-in to generate a virtual walk-through. Techniques such as image stitching, warping and projection are used to simulate a real movement of the camera from this set of photographs. Several systems are also commercially available such as Apple QuickTime VR, or IPIX. A series of video frames are thus created 'on-the-fly'. The system then encodes these video frames into coded video data that is then streamed over cable towards the user's TV. For help and guidance purposes, the system may also be able to composite other images over this walk-through video, such as a house plan or navigation instructions.

This type of interactive navigation is also suited for travel agents to reserve hotels, etc. The ability to navigate through an environment, even on a limited basis, provides the customer with a sense of being at the location and therefore, enables him or her to make a more informed better choice.

In another possible scenario, the user converses on the phone with a professional and there is a need for examining a document. The professional is able to use this system to present the document on the user's TV screen. The document can be an X-ray of the user's body, a large street map, a detailed web-page, an aerial picture, a set of vacation pictures, etc. In most cases, the document cannot be presented in its original format on the TV screen and cannot be simply scaled to fit the screen because this would result in an unacceptable loss of resolution. What is needed is a panning of a window over the document as well as the ability to zoom up or down. For multi-page documents there is a further need for skipping pages. The system takes the document image as input as well as the user's input for panning/zooming and generates a series of video frames that simulates this movement. These frames are again coded and streamed over to the user's TV screen.

In another scenario, the composition capabilities of the video encoder 160 can provide synchronized output to multiple end-points. When there are interactive back channels, the composing feature can depict interactions. This feature can allow remote users to see what someone else has done. For example, a picture may depict a set of selections, which a user can point to using a remote control. This pointing action can be depicted as an overlay and retransmitted to other users. If there are data-elements depicted that define interactive controls, e.g., HTML forms, the manipulation of those controls can be depicted as an overlay, and retransmitted as well. If a document camera was the image source, showing a paper document, any computer mouse, PDA input device, or other input device could circle, mark, or annotate the image, as an overlay to be retransmitted in the same manner.

In still yet another scenario, to maintain a passive experience for TV viewers, some information accessed through the Internet can be automatically converted into TV resolutions. Manual scrolling and paging can be replaced by applying algorithms that reformat the static images into a narrative stream. An accompanying audio track can be used, or the document text could be fed through a separate text-to-speech conversion. Using text to speech allows the audio track to automatically be registered with the coded video stills.

These stills could be paged, scrolled, to match the pace at which the audio track was played through the TV set. The encoding service would take care of composing the stills and the audio streams to make the presentation. Other compositional elements could be used, like highlighting words as they are read. In some cases, information gathered about hyperlinks could be used to depict (through animated graphical overlays) something about the destination. This hyperlink depiction can use contents of the destination that are prefetched. The user can simply watch a web-based presentation, or use the remote to move backwards or skip forwards at any time.

As discussed above, in one possible embodiment, the system may be used to provide a service to system subscribers. The subscriber can be a onetime, constant or periodic customer that inputs his or her personal preferences in order to customize the output. The subscriber's preferences may then be stored as a subscriber profile in the subscriber database 115.

FIG. 4 shows an exemplary subscriber profile 400. The subscriber profile can contain information about the viewing preferences of specific users/subscribers or subscriber households. These preferences may be accessible to the video sequence generator 150 through the input unit as references in the coding hints or the virtual camera scripts, for example.

The subscriber profile 400 may include a variety of preference information, such as preferred format settings 410 that may include the user's preferred text font and size, contrast settings, etc., coding preferences 420 that may include the user's preferred or required audio/video coding specifications, special handicap settings 430 that may include text and audio-coding preferences for subscribers having visual or auditory handicaps, and the address/URL of pictures, video clips, etc. 440 that may include the location of stored images of household members, local points of interest, and local merchants or professionals, which may used as all or part of the coded video sequence. Other categories of subscriber information may also be stored and used by the system, such as billing information, device characteristics (including characteristics of devices used by each household or business member), etc.

The use of the subscriber profile 400 provides the system with a level of flexibility. For example, subtitles or text in an image can be coded differently. Households with no preference would receive default images of text (coded according to algorithms that optimize text appearances). However, households with members who are visually handicapped might receive enlarged high contrast text images. Such images would be easier to read but would consume more screen space than the default text images.

Images of household members, local points of interest, and local merchants or professional can be retrieved from the subscriber database 115, cached in image database 120, and selectively referenced in the virtual camera scripts. The script would specify a variable (e.g., childs_face) whose value is assigned using the profile stored in the subscriber database 115. The value of this variable would specify a specific image or sequence of images in the image database. The use of subscriber images may be useful for a variety of applications, such as inserting an image (or sequence of images) of a realtor in a sequence of images that provide a tour of a house interior, or using the child's face on a well defined screen location in a cartoon, for example.

Initialization and subsequent modification to the subscriber profile 400 through the input unit 110 might occur in several ways. A web-based interface may allow households or customer care agents to set the value of a well-defined list of parameters. The user/subscriber could subscribe to the service on the service provider's Web page, for example. Alternatively, the parameters could be specified through an interactive TV screen, computer display or telephone, etc. The subscriber's input could be accomplished using a variety of known input methods, including interactive voice response (IVR), voice recognition, touch screen or stylus input, touchtone menus (DTMF), through a human customer-care agent, or by any other known input method. In any case, the list of parameters would be defined so that they may be easily referenced by the coding hints and camera scripts. Default settings for each parameter may be specified by the service provider, for example.

Another possible scenario for using the subscriber profile is in the field of advertisement. Advertisements may be stored or referenced so that they may be inserted during multimedia presentations. These advertisements may be targeted to an individual or a group, and may also be personalized. For example, an advertisement may read "Diane Jones, have we got a deal for you!" An advertiser may also be able to place local photos in an ad, such as showing a car on Main St. of the viewer's town, etc. Since the temporal synchronization can be controlled, an image can pop-up in the middle of a commercial and award $100 to the first (or tenth, etc.) person to press "1" on their remote control.

As shown in FIGS. 1 and 2, the method of this invention is preferably implemented on a programmed processor. However, the coded video sequence generating system 100 can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowchart shown in FIG. 3 can be used to implement the coded video sequence generating system 100 functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method comprising:
   receiving, by an input unit, a plurality of still images, wherein the plurality of still images are independent of a video and the plurality of still images are not related to the video;
   extracting, by the input unit, image data from the plurality of still images, the image data comprising virtual camera script data and coding hint data;
   deriving, by the input unit, a virtual camera script from a virtual camera script database based on the image data, the virtual camera script describing operations to transform the plurality of still images into a video sequence, wherein the virtual camera script comprises instructions resulting in simulated camera movement over portions of the plurality of still images during the video sequence;

deriving, by the input unit, a coding hint from a coding hints database based on the image data, wherein the coding hint specifies a frame number in a sequence and a number of frames;

generating, by a video sequence generator, the video sequence based on the virtual camera script and the coding hint;

generating, by a video encoder, a video encoding sequence based on the virtual camera script and the coding hint; and generating a customized sequence by inserting a customized advertisement in the video encoding sequence.

2. The method of claim 1, wherein the customized advertisement comprises an offer contingent on interaction with the customized advertisement.

3. The method of claim 1, further comprising:
receiving preference information from one of a user and a service provider; and
storing the preference information in a user profile, wherein the video sequence is based on the user profile.

4. The method of claim 3, wherein the user profile comprises one of format settings, coding preferences, handicap settings, storage settings, addresses of image data, device characteristics, and billing information.

5. The method of claim 4, wherein the format settings comprise one of text font settings, text style settings, and display settings.

6. The method of claim 4, wherein the coding preferences are used as coding hints and comprise one of audio coding preferences and visual coding preferences.

7. The method of claim 4, wherein the handicap settings comprise one of visual enhancement settings and audio enhancements settings.

8. The method of claim 4, wherein the storage addresses of image data comprise one of a computer image file, an image database, a Web page address, a universal resource locator, a floppy disk, and compact disk read-only memory.

9. The method of claim 3, wherein the user provides multimedia data input and preference information to an input unit using one of a touch-tone menu, an interactive voice response system, a voice recognition system, a touch screen, a stylus, a keyboard, a Web page, the Internet, a telephone, a cable television, a personal computer, and a wireless communication device.

10. The method of claim 3, wherein the user profile comprises information about the display devices owned by the user.

11. The method of claim 10, wherein the customized sequence is customized for one of the devices comprising the user profile.

12. A system comprising:
a processor; and
a computer-readable storage device having instructions stored which, when executed by the processor, cause the processor to perform operations comprising:
receiving, by an input unit, a plurality of still images, wherein the plurality of still images are independent of a video and the plurality of still images are not related to the video;
extracting, by the input unit, image data from the plurality of still images, the image data comprising virtual camera script data and coding hint data;
deriving, by the input unit, a virtual camera script from a virtual camera script database based on the image data, the virtual camera script describing operations to transform the plurality of still images into a video sequence, wherein the virtual camera script comprises instructions resulting in simulated camera movement over portions of the plurality of still images during the video sequence;
deriving, by the input unit, a coding hint from a coding hints database based on the image data, wherein the coding hint specifies a frame number in a sequence and a number of frames;
generating, by a video sequence generator, the video sequence based on the virtual camera script and the coding hint;
generating, by a video encoder, a video encoding sequence based on the virtual camera script and the coding hint; and
generating a customized sequence by inserting a customized advertisement in the video encoding sequence.

13. The system of claim 12, wherein the customized advertisement comprises an offer contingent on interaction with the customized advertisement.

14. The system of claim 12, wherein the computer-readable storage device has additional instructions stored which result in the operations further comprising:
receiving preference information from one of a user and a service provider; and
storing the preference information in a user profile, wherein the video sequence is based on the user profile.

15. The system of claim 14, wherein the user profile comprises one of format settings, coding preferences, handicap settings, storage settings, addresses of image data, device characteristics, and billing information.

16. A computer-readable storage device having instructions stored which, when executed by a computing device, cause the computing device to perform operations comprising:
receiving, by an input unit, a plurality of still images, wherein the plurality of still images are independent of a video and the plurality of still images are not related to the video;
extracting, by the input unit, image data from the plurality of still images, the image data comprising virtual camera script data and coding hint data;
deriving, by the input unit, a virtual camera script from a virtual camera script database based on the image data, the virtual camera script describing operations to transform the plurality of still images into a video sequence, wherein the virtual camera script comprises instructions resulting in simulated camera movement over portions of the plurality of still images during the video sequence;
deriving, by the input unit, a coding hint from a coding hints database based on the image data, wherein the coding hint specifies a frame number in a sequence and a number of frames;
generating, by a video sequence generator, the video sequence based on the virtual camera script and the coding hint;
generating, by a video encoder, a video encoding sequence based on the virtual camera script and the coding hint; and
generating a customized sequence by inserting a customized advertisement in the video encoding sequence.

17. The computer-readable storage device of claim 16 wherein the customized advertisement comprises an offer contingent on interaction with the customized advertisement.

18. The computer-readable storage device of claim 16, the computer-readable storage device having additional instructions stored which result in the operations further comprising:
    receiving preference information from one of a user and a service provider; and
    storing the preference information in a user profile, wherein the video sequence is based on the user profile.

* * * * *